(No Model)

C. R. HARRIS.
CLASP.

No. 433,466. Patented Aug. 5, 1890.

Witnesses
E. J. Nottingham
G. F. Downing

Inventor
Charles R. Harris
By his Attorney
H. A. Seymour

UNITED STATES PATENT OFFICE.

CHARLES R. HARRIS, OF WILLIAMSPORT, PENNSYLVANIA.

CLASP.

SPECIFICATION forming part of Letters Patent No. 433,466, dated August 5, 1890.

Application filed October 12, 1889. Serial No. 326,769. (No model.)

*To all whom it may concern:*

Be it known that I, CHARLES R. HARRIS, of Williamsport, in the county of Lycoming and State of Pennsylvania, have invented certain new and useful Improvements in Clasps; and I do hereby declare the following to be a full, clear, and exact description of the invention, such as will enable others skilled in the art to which it appertains to make and use the same.

My invention relates to an improvement in clasps for supporting garments—such as under-drawers, stockings, and similar articles of apparel—the object of the same being to produce a simple, neat, and inexpensive device susceptible of quick and easy application, capable of withstanding the constant strain which such devices are intended to sustain without undue wear or strain upon the garment which it holds.

A further object is to provide a clasp having the fewest possible number of parts and so connected with each other that springs and similar external means for holding the jaws together and teeth are entirely dispensed with.

With these ends in view my invention consists in a pair of overlapping toothless jaws having sliding differential connection with each other; and it further consists in certain novel features of construction and combination of parts, as will be hereinafter described, and pointed out in the claims.

Figure 1:
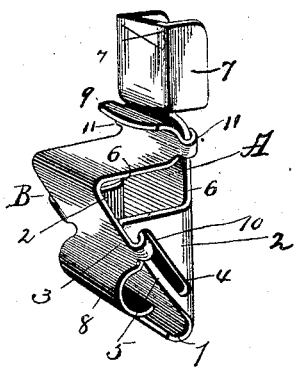
Figure 2:
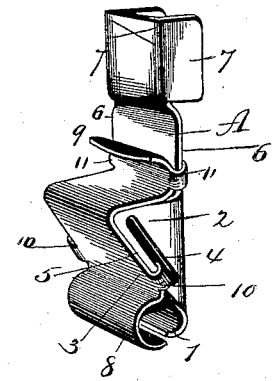
Figure 3:
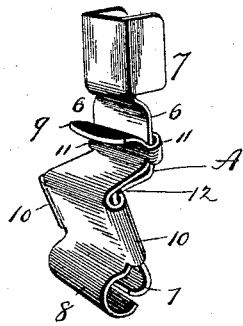

In the accompanying drawings, Figure 1 is a view in perspective of my improved clasp, showing the jaws open. Fig. 2 is a similar view showing the jaws in closed position, and Fig. 3 is a modification.

A represents a narrow metal plate bent upward at the forward end to form the rigid holding-jaw 1, and having a pair of projections 2 2 on its edges, which are bent at right angles to the body of the plate. Said projections have inclining forward edges 3 3, and elongated slots 4 4 in each projection extend parallel with the forward edges 3 3, thus producing the narrow guides 5 5, to be referred to hereinafter. Rearward of the projections 2 2 the edges 6 6 of the plate A are parallel with each other, and at the extreme rear end of the plate the shank 7 of the clasp is formed for attachment to the supporter.

B is the plate which constitutes the movable or sliding jaw. This plate is preferably the same width as plate A, and is bent through its central portion to conform substantially to the general shape of the projections 2 2, against which this portion normally rests. The forward end of this plate is bent, as shown, into an overlapping jaw 8, and the opposite or rear end of the plate, after extending down to the plate A back of the projections 2 2, is turned upward to produce the handle 9, by means of which the movable jaw is slid back and forth. Four hooks 10 10 11 11 or equivalent devices are bent around the guides 5 5 on the projections 2 2 and the edges 6 6 of plate A. This is the only means of connection between the two plates A and B, and a slight examination will show that as the hooks 11 11 slide back and forth on the edges 6 6 the hooks 10 10 slide up and down upon the guides 5 5, thus throwing the jaws apart and together. Hence to clasp a garment the handle 9 is drawn back. The jaw 8 rides upon the guides 5 5, leaving them open sufficiently for all practical purposes. After placing the garment between them the movable jaw is slid forward until it overlaps or passes slightly beyond the rigid jaw, where it stops, holding the garment firmly between the jaws, from the grasp of which it is impossible to remove the garment until the movable jaw is again drawn back. So the harder the pull on the garment when between the jaws the tighter it is held.

In the modification, instead of the inclines being made by the projections 2 2, the plate A is bent into the shape to take the place of the inclines. In this clasp the hooks 10 10 11 11 all embrace the straight edges of the plate, and said edges are recessed at 12 to permit the hooks 10 10 to pass.

It is evident that other changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. A clasp consisting, essentially, of a pair of clamping-jaws having sliding connections with each other at two points, the bearing for one of said sliding connections being in a plane substantially parallel with the back of the under jaw and the other arranged at an angle thereto, so that in operation the jaws may be opened both vertically and laterally, substantially as set forth.

2. In a clasp, the combination, with a rigid plate having a jaw on one end and inclining and straight edges at the sides, of a movable plate having an overlapping jaw thereon and hooks or similar devices thereon embracing and bearing on the inclining and straight edges of the rigid plate, substantially as set forth.

3. In a clasp, the combination, with a rigid plate having a jaw on one end and projections on the sides having inclining guides thereon, of a movable plate having an overlapping jaw at one end and hooks at the sides, which loosely embrace the guides and edges of the rigid plate, substantially as set forth.

4. The combination, with a rigid plate having a jaw on one end and a shank on the other end, projections on the edges, said projections having elongated slots therein, and inclining guides formed between the forward edges of the projections and the slots, of a movable plate fitted to the other plate and having a jaw on one end and hooks on the edges, which embrace the guides and the edges of the plate, substantially as set forth.

In testimony whereof I have signed this specification in the presence of two subscribing witnesses.

CHARLES R. HARRIS.

Witnesses:
R. S. FERGUSON,
CHAS. S. DRURY.